Feb. 13, 1951 T. VON VOSS 2,541,796
DOUBLE CAMERA FOR STILL AND MOTION-PICTURES
Filed Jan. 15, 1948 2 Sheets—Sheet 1
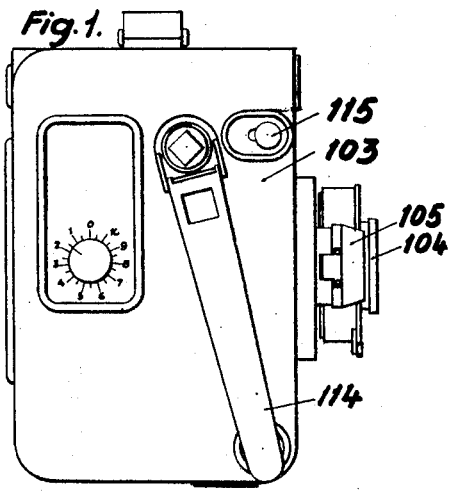
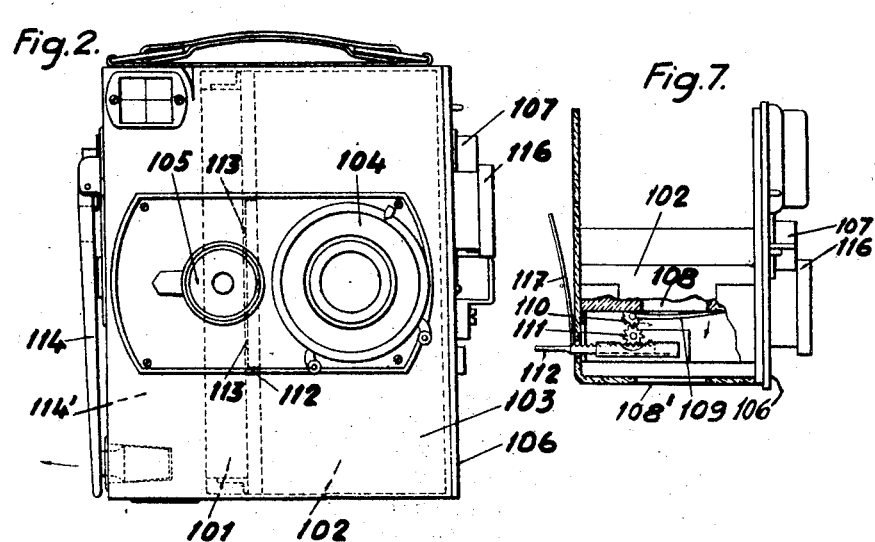
Inventor
TAGE VON VOSS, DECEASED
BY VICTOR WETTERSTROM, ADMINISTRATOR
by Singer, Ehlert, Stern & Carlberg,
Attorneys.

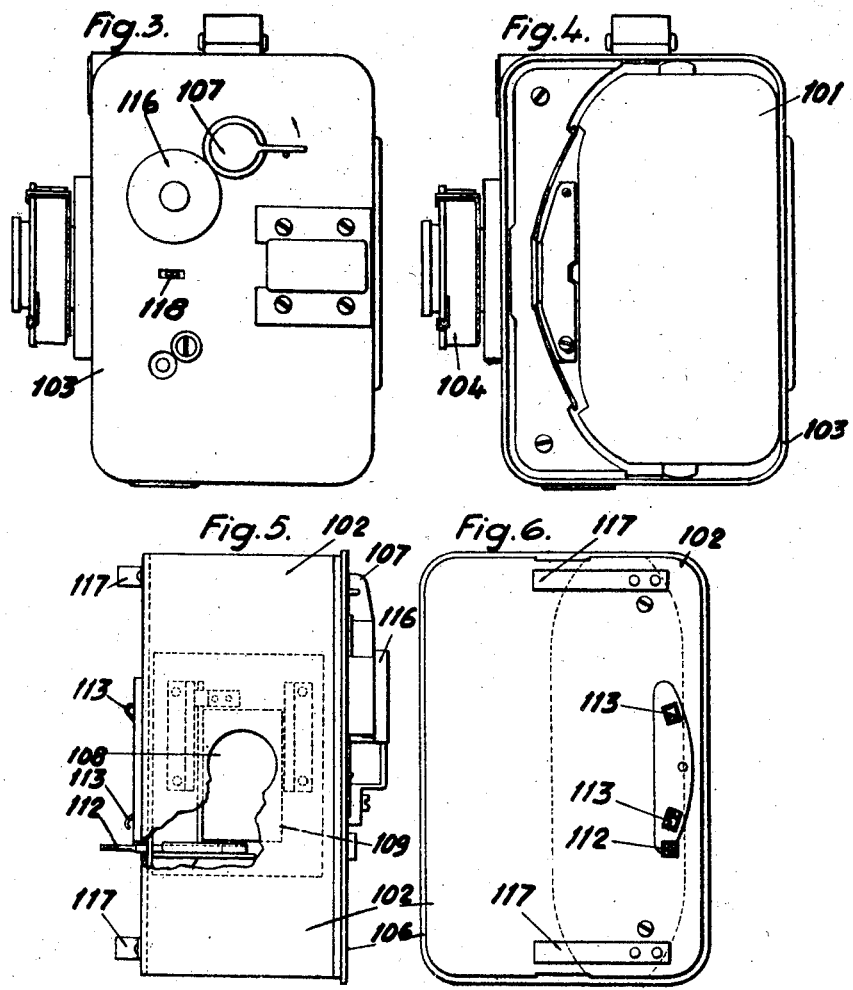

Patented Feb. 13, 1951

2,541,796

UNITED STATES PATENT OFFICE 2,541,796

DOUBLE CAMERA FOR STILL AND MOTION PICTURES

Tage von Voss, deceased, late of Stockholm, Sweden, by Victor Wetterström, administrator, Stockholm, Sweden Application January 15, 1948, Serial No. 2,503
In Great Britain February 7, 1940

Section 1, Public Law 690, August 8, 1946
Patent expires February 7, 1960

4 Claims. (Cl. 88—16)

The present invention relates to a double camera for taking cinematograph or single pictures as desired.

There is a general demand for a double camera for cinematography as well as for still photography, by which it is possible to make little pictures of the occurrences that are filmed. Attempts have been made to solve this problem by providing an ordinary camera with devices for changing the single-picture camera into a cinematograph camera. It is easily understood that such a solution is not satisfactory. Another cinematograph camera has been proposed, which may be changed into an ordinary camera by taking out the whole cinematographic device, but this operation must be done in a dark-room, in order that the cinematograph film does not become spoiled. Between two such operations in the dark-room, which often is not at disposal when needed, the apparatus consequently is only a single-picture camera or only a cinematograph camera.

It is the object of the invention to provide a double camera in which a cinematograph magazine and a little-picture film device are arranged one next to each other in a common camera casing and that a separate objective is provided for each film. In this form of construction the new camera has two optical axes, and it is possible to take cinematograph pictures and single pictures simultaneously or alternately in an arbitrary succession as one pleases, without taking any auxiliary measures except the steps (setting, release etc.) for the exposure itself. The cinematograph magazine and the little-picture film device require to be taken out of the camera casing only for loading.

Another object of the invention is to provide a double camera with a single camera casing in which a cinematograph magazine is arranged in the interior of the casing and in which a little-picture film device is attached to a detachable wall or the cover of the casing, and in which camera a separate fixed objective is provided for each of the two films.

It is also an object of the invention to arrange in a double camera the cinematograph magazine and the little-picture film device beside each other in such a way that the cinematograph film will move vertically, preferably downward, when the camera is carried, and that one side wall of the camera casing is made as a detachable cover and thus as a carrier for the little-picture film device.

In the drawings:

Fig. 1 is a side elevation view of a double camera made in accordance with the invention.

Fig. 2 is a front elevation view of the camera.

Fig. 3 is a side elevation view of the other side of the camera.

Fig. 4 shows the camera from the same side as Fig. 3 but with the cover and the device for the little-picture film removed so that the cinematograph magazine is visible.

Fig. 5 shows the cover with the device for the little-picture film, seen from the side facing the objective.

Fig. 6 shows the device for the little-picture film seen from the side facing the cinematograph magazine, and Fig. 7 is a top plan view of the part shown in Fig. 5 with parts in horizontal section and other parts broken away.

The camera according to the invention consists of a device 101 for cinematograph films and a device 102 for little-picture films, which are placed side by side in a common casing 103 carrying the objectives 105 and 104 for both said devices respectively. The device 102 for the little-picture film is attached to the cover 106, so that when the cover is taken off this device is also removed, thereby providing access to the device 101 for the cinematograph film. The cover 106 is provided with a locking device which is controlled by means of a handle 107 at the outer side of the cover.

At the side of the casette for the little-picture film, which is directed towards the objective, this casette is provided with alined openings 108, 108' (Fig. 7) for the exposure of the film. The opening 108 is automatically closed, when the cover 106 is removed, so that the film will not be exposed when the device for the little-picture film is exposed to daylight. For this purpose there is provided a shutter 109 (Figs. 5 and 7), which is fixed on the shaft carrying a gear 110 meshing with a gear 111, which latter gear 111 meshes with a rack provided with a spring actuated pin 112 extending out of the casette. When the device for the little-picture film has been removed from the casing, the pin 112 is in the position shown in Figs. 5 and 7, and the shutter 109 is closed. When the device is inserted in the camera casing, the pin 112 is pressed in against the spring action and thus the shutter 109 is opened.

The device 102 for the little-picture film has at that side thereof, which faces the device 101 for the cinematograph film, resilient projections 113, which rest against the magazine for the cinematograph film and hold it in the correct position.

A raisable crank 114 serves to wind up a spring of the driving mechanism 114' for the cinematograph film, and a button 115 serves to start this driving mechanism. A button 116 serves to exchange the film in the little-picture casette. When the cover 106 is unlocked springs 117 press the device 102 for the little-picture film outwardly of the camera casing.

The camera functions as a usual camera with the only difference that it has two objectives. Since the button 115 for starting the movement of the cinematograph film is situated at one side of the camera and the lever 118 for operating the objective for the little-picture film is situated at the other side thereof, it is possible when holding the camera with both hands to expose both films simultaneously.

The device according to the invention is not limited to the constructional forms shown but may be modified in many details within the scope of the invention.

Having now described the invention, what is claimed as new and desired to secure by Letters Patent is:

1. In a double camera, a common camera casing provided with a detachable wall, means for taking cinematograph pictures and means for taking still pictures mounted in said camera casing, each of said picture taking means being provided with their own objective, said cinematograph picture taking means including a cinematograph film magazine arranged removably within said camera casing, and said still picture taking means including a little-picture film device, fixedly attached to said detachable wall, said film magazine and said little-picture device being positioned one next to the other within said camera casing, in the operative position of the camera, resilient means on said little-picture device engaging said film magazine to hold it in operative position, and locking means on said detachable wall to hold it attached to said camera casing.

2. In a double camera, a common camera casing having a front wall and a detachable side wall, means for taking cinematograph pictures and means for taking still pictures, each of said picture taking means being provided with their own objective mounted on said front wall, said cinematographic picture taking means including an operation controlling means mounted on the side wall of the casing which is opposite said detachable side wall and a cinematographic film magazine arranged removably within said camera casing, and said still picture taking means including a little-picture film device, fixedly attached to said detachable side wall, and an exposure controlling means projecting from the exterior face of said removable side wall, said film magazine and said little-picture device being positioned one next to the other within said camera casing, in the operative position of the camera, resilient means on said little-picture device engaging said film magazine to hold it in operative position, and locking means on said detachable side wall to hold it attached to said camera casing.

3. In a double camera according to claim 1, an exposure opening arranged in alinement with the objective provided for taking still pictures when said little-picture device is in operative position within said camera casing, and including a shutter arranged to automatically close said exposure opening when said little-picture device is removed from said camera casing and to automatically open said exposure opening upon insertion of said little-picture device into said camera casing, said shutter comprising a pivotally mounted flap, a spring-actuated rack tending to move said flap to closed position, and a control pin on said rack and projecting from said little-picture device to move the flap to open position when it engages an obstruction in said camera casing upon insertion of said little-picture device into the same.

4. In a double camera, a common camera casing provided with a detachable wall, means for taking cinematograph pictures and means for taking still pictures mounted in said camera casing, each of said picture taking means being provided with their own objective, said cinematograph picture taking means including a cinematograph film magazine arranged removably within said camera casing and said still picture taking means including a little-picture film device fixedly attached to said detachable wall, said film magazine and said little-picture device being positioned one next to the other within said camera casing, in the operative position of the camera, resilient means on said little-picture device engaging said film magazine to hold it in operative position, locking means on said detachable wall to hold it attached to said camera casing, and spring means between adjacent faces of said film magazine and said little-picture device and secured to one of said faces for pushing the little-picture device outwardly from the camera casing when said locking means is unlocked.

VICTOR WETTERSTRÖM.
*Administrator of the Estate of Tage von Voss, Deceased.*

REFERENCES CITED

The following references are of record in the file of this patent:

UNITED STATES PATENTS

| Number | Name | Date |
|---|---|---|
| 1,258,712 | Shaw | Mar. 12, 1918 |
| 2,256,517 | Cohen | Sept. 23, 1941 |
| 2,393,316 | Edgerton | Jan. 22, 1946 |
| 2,420,197 | Rosenthal | May 6, 1947 |

FOREIGN PATENTS

| Number | Country | Date |
|---|---|---|
| 132,946 | Germany | July 30, 1902 |